UNITED STATES PATENT OFFICE.

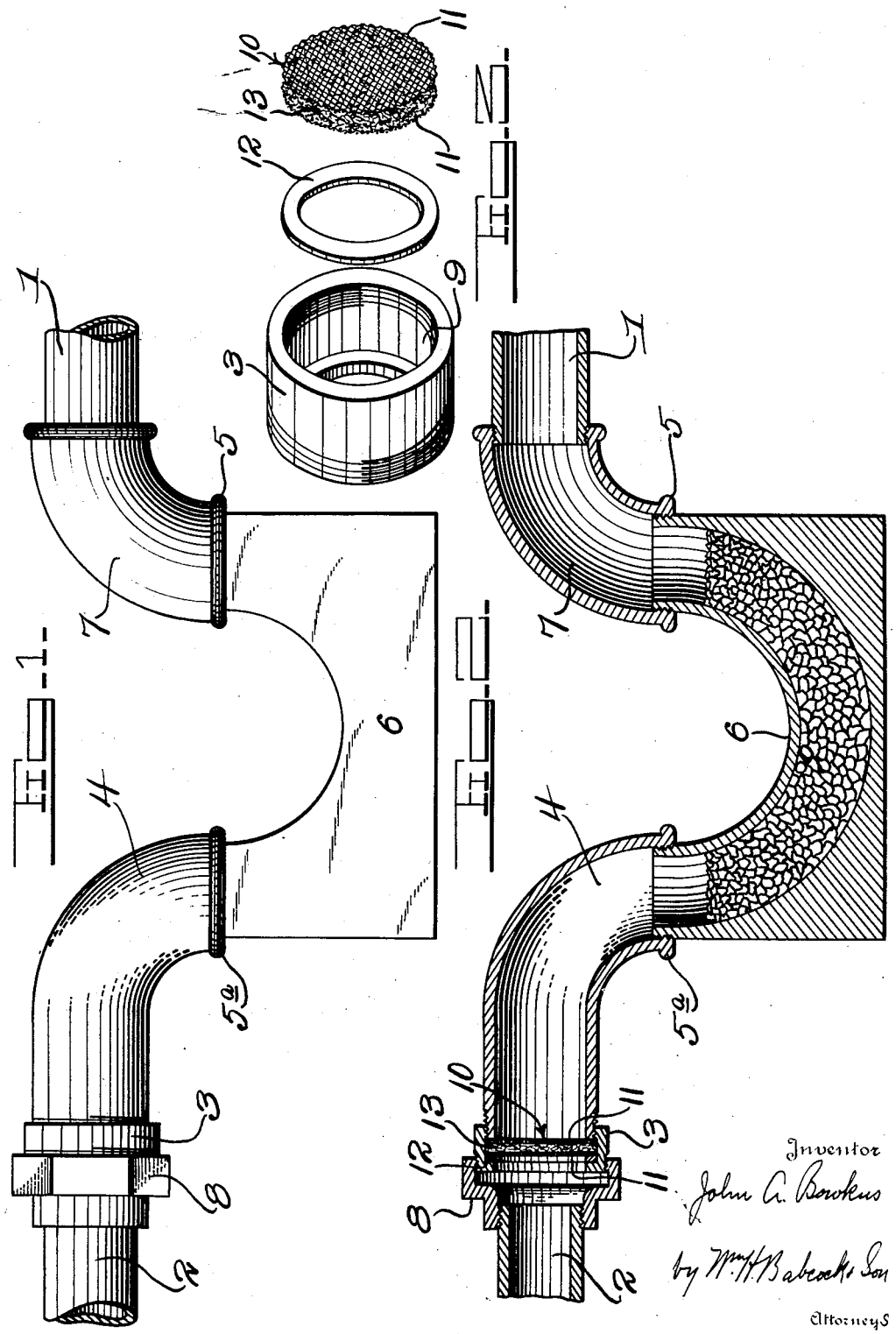

JOHN A. BOWKUS, OF GRAND RAPIDS, MICHIGAN.

GAS SAVER AND PURIFIER.

1,221,278. Specification of Letters Patent. Patented Apr. 3, 1917.

Application filed October 5, 1916. Serial No. 123,864.

*To all whom it may concern:*

Be it known that I, JOHN A. BOWKUS, a citizen of the United States, residing at Grand Rapids, in the county of Kent and State of Michigan, have invented certain new and useful Improvements in Gas Savers and Purifiers, of which the following is a specification.

This invention relates to devices for purifying gas as it flows through the gas pipe and increasing its illuminating power; and consists in the construction and combination of parts hereinafter set forth and claimed.

In the accompanying drawings:

Figure 1 represents a side elevation of a part of the gas pipe (broken away) and the mechanical filter and chemical purifier used therewith, embodying my invention;

Fig 2, a central vertical longitudinal section of the same; and

Fig. 3, a detail view, on a larger scale, of the filter holding box and the washer and filter detached.

Two horizontal sections 1 and 2 are shown having between them the chemical purifier, the mechanical filter, a pair of tubular elbows and couplings. Pipe section 1 is connected to the upper end of elbow 7. The lower end of the latter is connected by a threaded coupling flange 5 to one of the upper ends of a depending U-shaped tubular purifier 6 consisting of a block having an U-shaped passage shown surrounded at the ends by raised screw-threaded parts and normally forming part of the conduit for the flow of gas, the corresponding other upper end of the latter being similarly connected by coupling collar 5ª to an elbow 4, the horizontal upper end of which is in line with pipe section 2 and screws into intervening filter box 3, the latter being connected on the other side to said pipe section 2 by a coupling member 8, one part of which is enlarged to provide inwardly presented screw-threads engaging external screw-threads of said box.

The purifier 6 is charged with lime and clay moistened with water. It forms part of the conduit for the flow of gas, but is easily separable therefrom. Its bottom and its sides are squared, so that when separated it may be set down securely in one of several positions for convenient inspection and cleaning.

The filter 10 consists of two disk form screens 11, between them having a layer of cotton batting or some other form of soft unwoven cotton 13 or equivalent fibrous material. The filter holding box 3 is annularly recessed at 9 on the side toward elbow 4 to receive the peripheral part of this filter, also the washer 12, which fits between said filter and the rear wall of this recess. When the filter 10 is set into said box and the screw-threaded connection between the latter and elbow 4 is tightened the filter is necessarily clamped in place. But all the elements hereinbefore mentioned are easily detachable.

The lime and the aqueous moisture of the clay will eliminate divers impurities from the gas and detain them in the purifier. Nevertheless, it may happen, especially when the gas pressure is unusually great, that some impurities and other undesirable substances will be carried along by the current of gas beyond the purifier. In this event, the layer 13, of cotton, will trap and retain all such impurities which are less fine and subtle than the pure gas. The latter penetrates the cotton and flows on beyond it.

The combined action of the chemical purifier and mechanical filter will thus produce a very pure illuminating gas.

I am aware that lime has been used for purifying gas, that clay has been saturated with water for many purposes, that water has been used to absorb divers gases and that it is not new to locate chemical purifying agents in the bend of a pipe. I do not claim any of the above subjects matter.

Having thus described my invention, what I claim as new and desire to secure by Letters Patent is:

1. A gas purifier consisting of a block having a U-shaped passage formed therein and adapted to contain purifying chemicals and its sides, ends and bottom squared so that it may be set up independently on either side or either end or on its bottom, in combination with gas pipe sections detachably connected to said purifier at the ends of said passage in order that the latter may ordinarily form part of the gas conduit, though easily separable therefrom for setting up as stated.

2. In combination with two sections of a gas pipe, a rectangular block detachably attached thereto and provided with a curved chemical-containing passage normally forming part of the gas conduit and with an elongated flat bottom for greater security after said purifier has been detached and set up independently.

3. In combination with the sections of a gas pipe, a filter detachably held thereto and comprising a disk-form screen, an annular casing and holding washer and a chemical purifier also detachable from said pipes, but provided with a curved chemical containing passage normally forming part of the gas conduit, said purifier having an elongated flat bottom and broad elongated squared sides, in order that, when separated from the gas pipe, said purifier may be set securely apart on its side or bottom substantially as set forth.

In testimony whereof, I have signed my name to this specification in the presence of two subscribing witnesses.

JOHN A. BOWKUS.

Witnesses:
 W. M. BOWKUS,
 MAY C. DE VRIES.